United States Patent
Lang

(10) Patent No.: US 6,422,735 B1
(45) Date of Patent: Jul. 23, 2002

(54) HYDRAULIC JET FLASH MIXER WITH OPEN INJECTION PORT IN THE FLOW DEFLECTOR

(76) Inventor: John Stewart Lang, 2209 S. Anchovy AV, San Pedro, CA (US) 90732

(*) Notice: Subject to any disclaimer, the term of this patent is extended or adjusted under 35 U.S.C. 154(b) by 0 days.

(21) Appl. No.: 09/399,390

(22) Filed: Sep. 20, 1999

(51) Int. Cl.⁷ .................................................. B01F 5/02
(52) U.S. Cl. ............................... 366/162.4; 366/175.2
(58) Field of Search ....................... 366/167.1, 162.4, 366/173.1, 174.1, 175.2; 239/432, 318, 504, 523; 261/76; 137/896

(56) References Cited

U.S. PATENT DOCUMENTS

| | | | | |
|---|---|---|---|---|
| 3,598,534 A | * | 8/1971 | Templer | |
| 4,753,535 A | * | 6/1988 | King | |
| 4,812,049 A | * | 3/1989 | McCall | |
| 4,869,595 A | * | 9/1989 | Lang et al. | |
| 5,176,448 A | * | 1/1993 | King et al. | |
| 5,183,335 A | * | 2/1993 | Lang et al. | |

* cited by examiner

*Primary Examiner*—Charles E. Cooley
*Assistant Examiner*—David Sorkin

(57) ABSTRACT

A hydraulic jet flash mixer injects chemicals in the form of liquids, or slurries, or gases, into a fluid stream. The mixing system withdraws a side stream of fluid from a main fluid stream. The side stream is pressurized and directed through a convergent nozzle, producing a high-velocity jet. This jet is directed onto a deflector plate located on the center line of the conduit that carries the main fluid stream and is thereby diverted in the radial directions normal to the flow direction of the main fluid stream. The deflector is provided with an open port for injecting the chemicals that are to be mixed into the main stream. The even distribution of the injected chemicals is ensured by the hydrodynamic forces generated by the flow of the high-velocity jet over the deflector.

34 Claims, 8 Drawing Sheets

HYDRAULIC JET FLASH MIXER WITH OPEN INJECTION PORT IN THE FLOW DEFLECTOR

FIELD OF THE INVENTION

This invention relates to mixing chemicals in a fluid stream and more particularly to hydraulic diffusion flash mixing of chemicals in water treatment and waste water treatment.

BACKGROUND OF THE INVENTION

Chemicals have long been used in the treatment of water and waste water. In instances of treatment practice it is possible to identify the application of chemicals in the form of gases, liquids and solids. In all cases it is advantageous to achieve a uniform dispersal of the chemicals into the water stream as rapidly as possible and to ensure that chemicals that have already been dispersed do not return to the region wherein fresh chemicals are being introduced into the water stream. Meeting this last condition requires that the dispersal and mixing of the chemicals be done in a plug flow regime.

A first class of chemicals applied in the liquid form in water and waste water treatment is coagulants. They are used to induce flocculation of particles suspended in the raw water to be treated. This aggregation of suspended particles allows for more efficient sedimentation and/or filtration downstream. For best results, the initial mixing of the chemical coagulant with the raw water should occur as rapidly as possible to form a homogenized mixture within a second, or less.

The principal objective of this rapid or flash mixing in coagulation practice is to ensure a homogeneous coagulation by completely uniform dispersal of the coagulant throughout the water. In this way, the coagulant can make contact with the maximum number of suspended particles prior to the completion of hydrolysis, enabling intermediate complexes to destabilize the suspended particles initiating aggregation. This chemistry of destabilization sets some of the requirements for efficient rapid mixing.

Chemical coagulants should be dispersed in an unblended stream of raw water. Dispersing chemicals into a blended or partly blended stream (backmixing) can lead to poor destabilization of a fraction of the particles because some might have insufficient surface coverage while others might have too extensive surface coverage by adsorbed chemical species. This wastes chemicals and results in less effective floc formation for a given amount of a coagulant.

Stagnation time, defined as the amount of time that elapses from the addition of a coagulant to the start of mixing, should be reduced for the most effective coagulation. Experts on coagulation suggest that a sufficiently short stagnation time is achieved with a hydraulic jet mixer if the jet plume can be made to cover the entire cross section of the mixing conduit within one conduit diameter downstream of the mixer location when the conduit is flowing at its maximum capacity.

A second class of chemical used in water and waste water treatment includes those associated with disinfection. The primary concern in water and waste water treatment is the elimination of water born disease. Suspended particles are removed from potable water primarily because they can interfere with disinfection by shielding pathogens from contact with biocides. The aesthetics of suspended particle removal is a secondary concern.

The chemicals used in disinfection practice are chlorine, ammonia and ozone. Chlorine and ammonia can be fed as a gas or as a solution in water. Ozone is fed as a gas. In all cases, the concerns about short stagnation time, even dispersion, and avoidance of backmixing that have been enumerated in the discussion of coagulation apply to the disinfection process. When a disinfectant is fed as a gas it is also necessary to ensure efficient transfer of the disinfectant from the gas phase to the liquid phase by minimizing the size of the gas bubbles. Small bubbles are preferred because a disinfectant molecule has a shorter distance to travel from the interior of the bubble to the gas-liquid interface, and because the ratio of surface area to volume is larger for small bubbles. Both of these considerations improve the gas to liquid mass transfer process.

A third class of chemicals is used in water treatment to eliminate unpleasant taste and odor. Most often potassium permanganate and activated carbon are used for this purpose. Potassium permanganate is fed as a solution in water. Powered activated carbon (PAC) is fed as a slurry. When activated carbon is used in the granulated form, the water to be treated is passed through fixed beds of the granulated material. Rapid mixing is used to feed potassium permanganate and PAC and the concerns about short stagnation time, even dispersion, and avoidance of backmixing that have been enumerated in the discussion of coagulation apply to the elimination of taste and odor by the use of these chemicals.

From a mechanical point of view, a rapid mixing device should be simple, practical, and relatively inexpensive and should not create appreciable head loss.

Through the years, in attempting to meet theses chemical and mechanical requirements, many devices have been employed to provide rapid mixing needed for chemical dispersion. These include the weir, the Parshall Flume, and rapid mixing chambers equipped with mechanical rotary mixing devices such as propellers or turbines and in-line blenders. More recently, hydraulic diffusion flash mixing has been used as a method providing rapid mixing without appreciable head losses and lower operating and maintenance costs than mechanical methods. This method also provides more efficient rapid mixing with reductions to 20 to 50 percent in chemical consumption over mechanical methods.

Generally hydraulic diffusion flash mixing operates by drawing off a portion of the water to be treated into a carrying water loop. The chemical to be dispersed is added to this drawn-off portion. The mixture of carrying water and chemical is then injected into the remainder of the water through a diffuser. A pump in the carrying water loop provides the pressure for injection.

Usually the diffuser is a radial diffuser which injects the carrying water and the chemical mixture perpendicular to the flow direction of the remaining water from a deflector plate or from several nozzles equally spaced about the circumference of a tube placed in the center of the conduit carrying the remaining water. Radial injection can also occur by injecting perpendicular to the flow direction from nozzles equally spaced about the pipe periphery. In theory, this alternative reduces head losses, but is more difficult to construct, so central injection is preferred.

In other versions of hydraulic jet diffusion, the jet nozzles are placed on a tube that crosses the major diameter of the conduit carrying the remaining water; or on a grid of tubes that crisscrosses the conduit carrying the remaining water. These jet nozzles can be situated so that they discharge perpendicular to the direction of flow in the conduit, or either upstream or downstream to the direction of flow.

These versions can cause objectional head losses in the conduit carrying the remaining water. The multiplicity of nozzles that are required to attain a short stagnation time, even dispersal, and avoid backmixing, require that the chemical be mixed with a relatively large amount of carrying water, That is inefficient in the amount of power required by mixing and requires the use of more chemical because the large dilution by carrying water reduces the efficiency of coagulation and can cause nozzle clogging by increasing the propensity of the coagulant to precipitate. Thus, central injection is preferred.

Sometimes the diffuser is a conical jet diffuser which injects carrying water and chemical mixture parallel to the flow direction of the remaining water through a single nozzle, directed either upstream or downstream with the flow, located in the center of the conduit carrying the remaining water. Both directional options are versions of the central injection scheme. Because flow through a conical nozzle requires more power than the convergent nozzle used in the radial jet versions, and because the water leaving the conical nozzle does not flow entirely perpendicular to the direction of flow of the remaining water, thus causing a degree of backmixing, and increasing stagnation time, the radial jet diffuser is preferred over the conical nozzle option.

Problems have developed with hydraulic jet diffusion mixing on some applications. Where hardness exists in the water under treatment, the addition of some chemicals, in particular coagulants and chlorine in the carrying water loop has lead to clogging of the diffuser nozzles. This clogging requires periodic plant shutdowns to clean the diffuser, resulting in greatly increased operating and maintenance costs.

A hydraulic diffusion flash mixing system in which chemicals are directly introduced into the carrying water flow is disclosed in U.S. Pat. No. 4,869,595 to Lang. In this system water to be treated flows in the main conduit, and a portion of this water is diverted and reintroduced into the main conduit by a narrow auxiliary pipe. The auxiliary pipe's outlet is formed by numerous small nozzles around the periphery of the auxiliary pipe for injecting carrying water perpendicular to the flow direction in the main conduit. A chemical feed pipe leads to a manifold positioned around the auxiliary pipe adjacent to the nozzles. The manifold has its own nozzles which surrounds the auxiliary pipe and inject chemicals in the direction of the main conduit water flow, i.e., perpendicular to the direction of the carrying water flow so that the chemical and the carrying water flow mix and at the same time mix with the main conduit water flow. However, the numerous injection nozzles create a relatively complex structure and are not immune from clogging due to particulate impurities in the injected chemical. This is so because of the relatively small volume of the chemical flow in relation to the treated water flow (on the order of a million times less), and because the chemical nozzles must be small enough so that the headloss through them is high enough to ensure that the chemical is properly dispensed through each chemical nozzle.

A refinement of the hydraulic diffusion flash mixing system disclosed in U.S. Pat. No. 4,869,595 to Lang, wherein the multiplicity of carrying water nozzles is replaced by a single carrying water nozzle and the multiplicity of chemical nozzles is replaced by a single chemical nozzle is disclosed in U.S. Pat. No. 5,183,335 to Lang et al. In this system water to be treated flows in the main conduit, and a portion of this water is diverted and reintroduced into the main conduit by a narrow auxiliary pipe. The auxiliary pipe's outlet is formed by a single nozzle for injecting carrying water either upstream or downstream to the flow direction in the main conduit. The carrying water jet impinges on a conical deflector plate who's axis of rotation is coaxial with the centerline of the carrying water jet nozzle and is located a short distance from the open end of the carrying water jet. The conical deflector plate turns the flow of carrying water perpendicular to the flow of water in the main conduit. In one variant of this system a chemical feed pipe leads to a poppet valve located at the apex of the deflector plate cone. In the other variant of this system a chemical feed pipe leads to an injector pipe that runs through the carrying water nozzle and is located so that the injector pipe's centerline is coaxial with the center line of the carrying water nozzle and the end of the injector pipe is located between the end of the carrying water nozzle and the apex of the deflector plate cone. In both variants of this system the chemical and the carrying water mix as they pass in contact with the deflector plate and then mix with the main conduit water flow. However, the injector pipe requires a supporting spider located inside the carrying water nozzle. This is costly to manufacture and is vulnerable to clogging if there are large particulates in the carrying water flow. Furthermore, the poppet valve is not suitable for the injection of gases or slurries.

SUMMARY OF THE INVENTION

The present invention promotes the efficient mixing of a chemical with water not only by directly injecting the chemical into a main water stream, but also by subjecting the chemical to turbulence created by a water supply pipe having a jet nozzle that supples a high-velocity water stream at the point where it is injected into the main water stream. More specifically, water to be treated flows through a main conduit, and a secondary pipe and the high-velocity nozzle injects a secondary flow of carrying water into the main water flow and in the same, or opposite, direction as the main flow. A deflecting device positioned downstream of the jet nozzle intersperses the high-velocity flow with the main flow by deflecting the high-velocity flow radially outward in all directions. Chemicals pass through a small supply line into the deflecting device and exit at, or adjacent to, the tip of the deflecting device in a direction perpendicular to the direction of the high-velocity jet. Chemicals mix with the high-velocity jet as they pass over the surface of the deflecting device and then mix within the main flow after they have passed over the deflecting device.

In an embodiment preferably suited for dispersal of liquids and slurries, the deflector's nozzle is a cylindrical cavity with a center line coaxial with the center line of the deflector. The opening of the deflector's nozzle, where chemicals are discharged, forms the apex of the conical deflector. Moreover the shape of the cylindrical cavity that forms the deflector's nozzle is preferably not that of a right cylinder, but flared like the end of a trumpet, the large end of the nozzle being the point where chemicals are first contacted by and mix with the high-velocity jet. The precise shape of the end of the deflector nozzle is a function of the density and viscosity of the chemicals it carries, the flow rate of those chemicals, and the velocity of the high-velocity jet. In general the bell shape must be determined for each particular application of this embodiment. The means of determination are preferably a numerical modeling process using a software program designed for that purpose. Such programs are generically known as Computer-aided Fluid Dynamic (CFD) programs and are available to the general public.

In an embodiment preferably suited for dispersal of gases, the deflector's nozzle is a cylindrical cavity with a center line coaxial with the center line of the deflector. The opening of the deflector's nozzle where gaseous chemicals are discharged, are ports on the surface of a right cylinder with an axis coaxial with the axis of the deflector, and located adjacent to the apex of the deflector cone. An educator tip is fitted to the apex of the deflector cone. The educator tip has a base diameter that is larger than the diameter of the deflector at the point of the educator tip' attachment. Moreover the base of the educator tip has a curvature such that a portion of the high-velocity jet passing over the apex is drawn inwards toward the axis of the deflector cone by the tendency of a flowing fluid to adhere to a surface. The gas is drawn outwards through the ports by the vacuum created by the high-velocity jet. The inward flow of a portion of the high-velocity jet shears the outward flow of gas into a multiplicity of small bubbles, usually with a diameter of less than 1 millimeter. These bubbles are of a size that is highly efficient for the mass transfer of chemicals from the gas phase to the liquid phase. The exact shape of the curvature of the base of the educator tip will vary with the velocity of the high-speed jet and the dimensions of the deflector cone. In general the curvature must be determined for each particular application of this embodiment. The means of determination being preferably a numerical modeling process using a CFD software program designed for that purpose.

DETAILED DESCRIPTION OF THE PREFERRED EMBODIMENTS

The invention relates broadly to the mixing of one or more chemicals in a fluid stream. However, it will be disclosed in two systems, one for treating potable water and one for treating waste water. In the potable water system coagulant is added to raw water, i.e., the water entering a water treatment plant, to induce flocculation of suspended particles. In the waste water treatment system, chlorine gas is added to the treatment plant effluent for disinfection. As explained in the Background Section, in both cases such mixing should occur very quickly. Hydraulic diffusion flash mixing is often used where rapid mixing is desirable because it is efficient.

Figure 1:
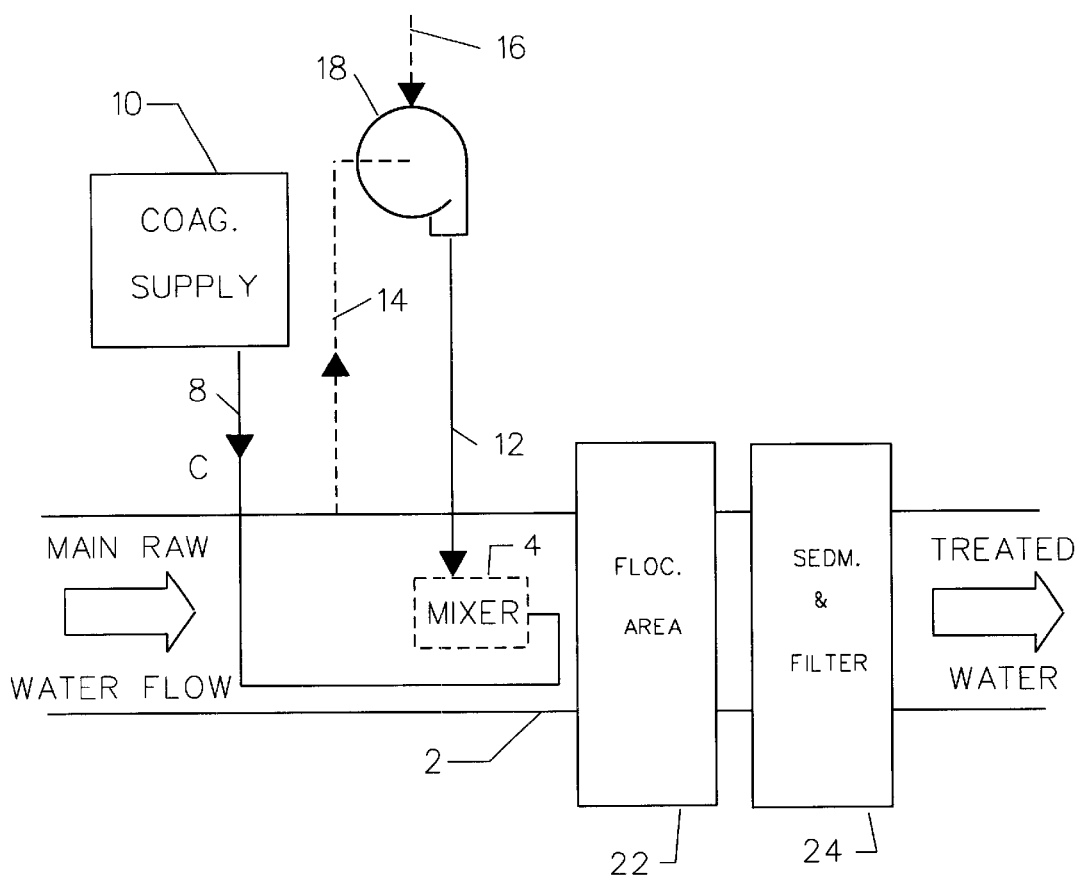
FIG. 1 is a schematic illustration of a water treatment system in which the first embodiment of the inventive mixer is being used.

In the potable water treatment system the raw water (RW) entering the system may be treated as in U.S. Pat. No. 4,869,595 and as in U.S. Pat. No. 5,183,335, incorporated by reference herein, in which the coagulant is mixed with the RW by a mixer located in a conduit to induce flocculation and then proceeds through the rest of the potable water treatment process, emerging as treated water (TW). More particularly, as shown in FIG. 1 of U.S. Pat. No. 5,183,335, also reproduced herein, the RW enters the system through conduit 2 and coagulant is mixed into the main flow by a mixer 4. Coagulant is supplied to the mixer 4 as is described in U.S. Pat. No. 4,869,595. A secondary flow of RW is drawn from conduit 2, or an other source, 16, is pressurized by pump 18 and is used to disperse the coagulant into the RW as is described in U.S. Pat. No. 5,183,335. The coagulated RW then flows through the rest of the treatment system, emerging as treated water.

Figure 2:
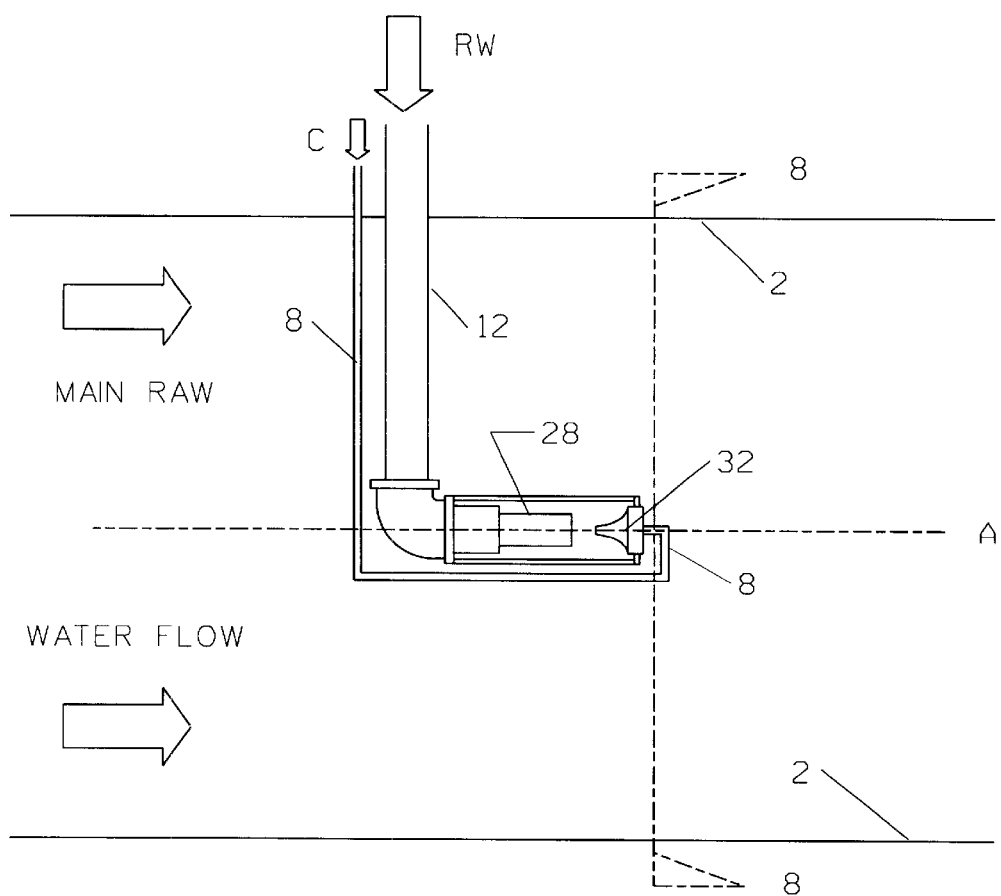
FIG. 2 shows a first embodiment of the inventive mixer in which coagulant is introduced into a deflecting device of the mixer.

FIG. 2 of U.S. Pat. No. 5,183,335, also reproduced herein, shows the details of flash mixer 4, which is formed by a high-velocity water jet and a deflecting device or assembly 32. The general arrangement of both preferred embodiments of this invention closely follow the arrangement described in column 4, lines 16 through 48 of U.S. Pat. No. 5,183,335 with only two modifications. One, the nozzle 28 may also preferably be a straight nozzle with a bell shaped entrance. Two, CFD calculations have shown that in order to preserve the jet flow's momentum as it passes over the deflector, it is preferred that the deflector cone's effective diameter be no more than twice the diameter of the jet nozzle.

Figure 3:
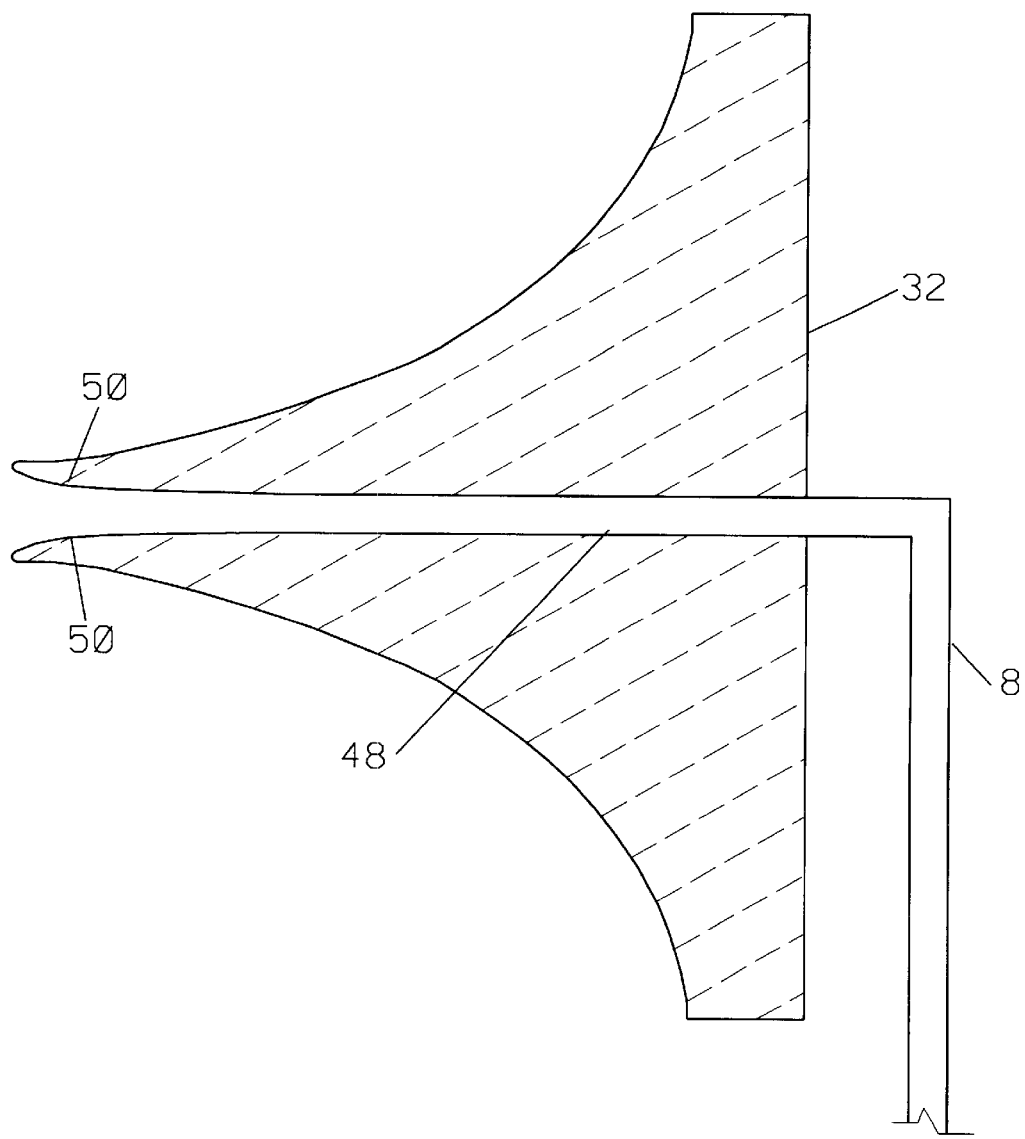
FIG. 3 is an enlarged sectional view of the deflecting element of the mixer in FIG. 2.

The deflector assembly of the preferred embodiment of this invention that is preferred for the injection of liquids and slurries is shown in detail in the enlarged cross sectional view of FIG. 3. A pipe 8, carries a liquid or a slurry that is to be mixer into the main flow to the deflector 32. A cylindrical passage 48, runs along the centerline of the deflector 32. The pipe 8, is connected to this cylindrical passage 48, be a suitable means. The walls of the cylindrical passage 48, are parallel except for the portion near the tip of the deflector 50, where they flair out into a bell shaped opening. The precise shape of the bell curve is determined by a CFD computation that accounts for the rate of flow in the main conduit, the rate of flow in the jet and the rate of flow and the nature of the liquid or slurry that is to be mixed into the main flow.

Figure 4:
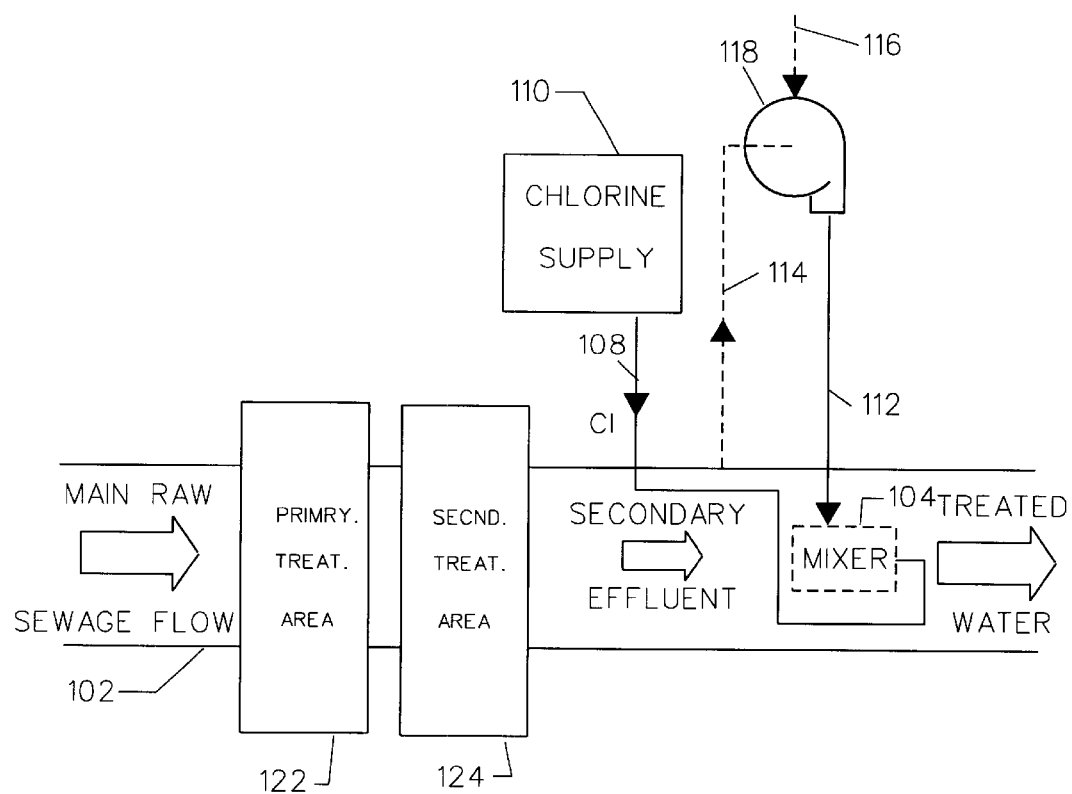
FIG. 4 is a schematic illustration of a waste water treatment system in which the second embodiment of the inventive mixer is being used.

FIG. 4 depicts a wastewater treatment system. Raw Sewage enter the plant through conduit 102 and passes through the primary treatment area, 122 and the secondary treatment area, 124, and emerges as Secondary Effluent (SE). This degree of treatment is common to the majority of waste water treatment plants in the United States and is considered suitable for discharge after the Secondary Effluent has been disinfected. In FIG. 4, the disinfection process shown is chlorination. Gaseous chlorine is withdrawn from a supply of chlorine gas, 110, by the vacuum created by the hydraulic jet diffusion mixer, 104. The chlorine supply, 110, also contains the means where by the flow of chlorine gas is metered and regulated. A secondary flow of SE is drawn from conduit 102, or an other source, 116, is pressurized by pump 118 and is used to disperse the chlorine into the SE as is described in U.S. Pat. No. 5,183,335.

Figure 6:
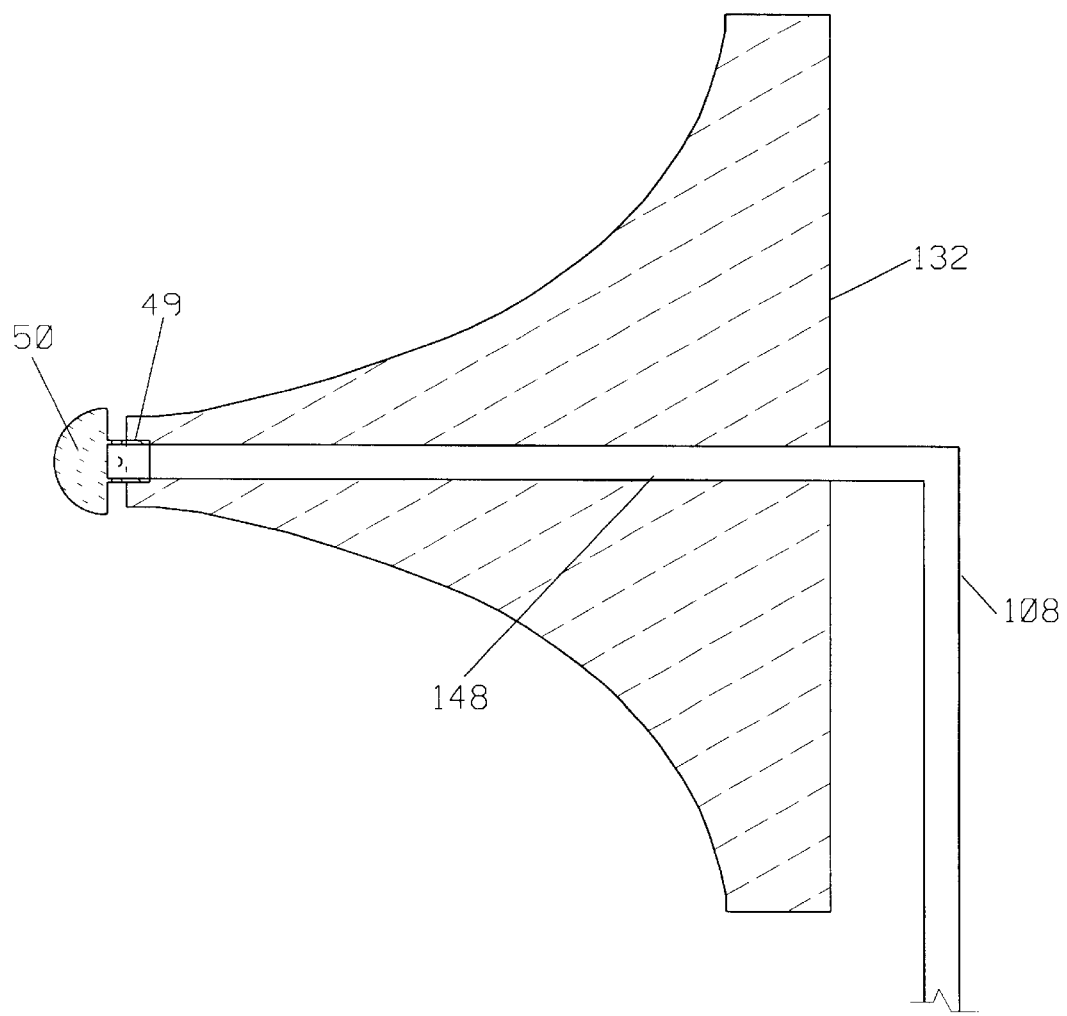
FIG. 6 is an enlarged sectional view of the deflecting element of the mixer in FIG. 5.
Figure 7:
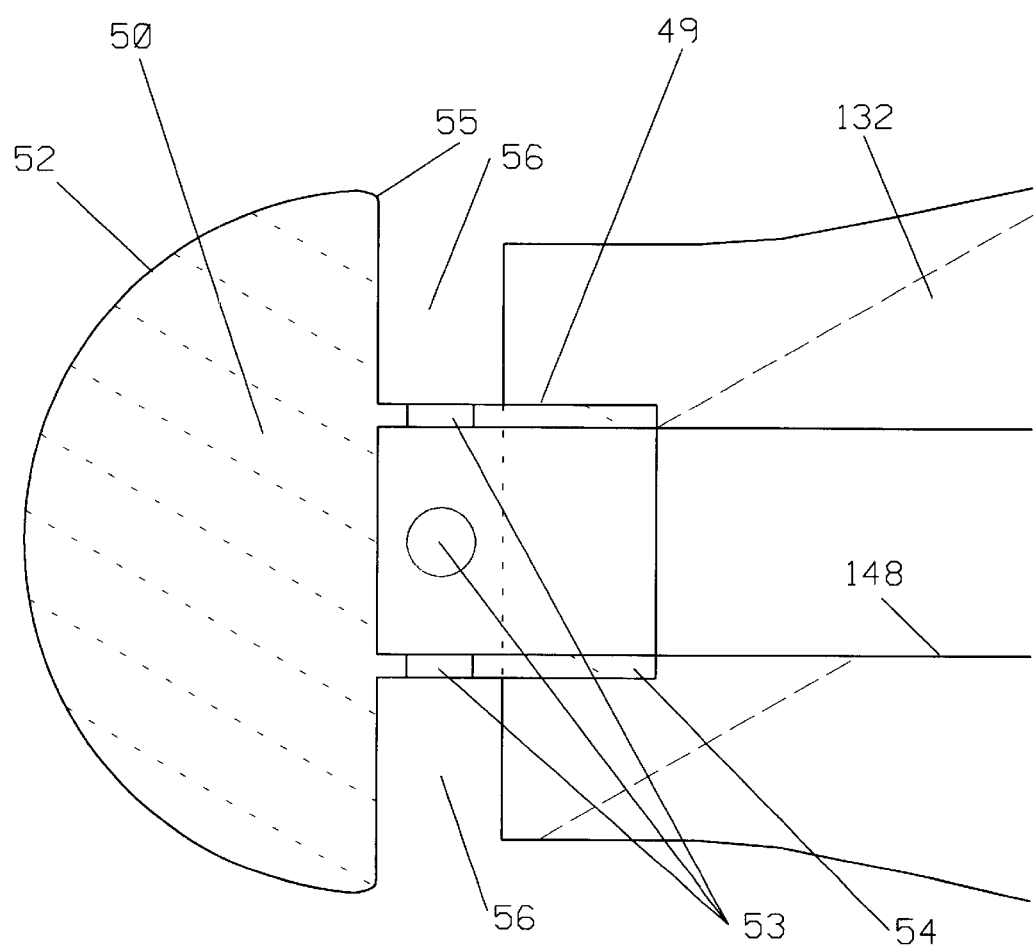
FIG. 7 is an enlarged sectional view of a portion of the deflecting element of the mixer in FIG. 5.

The deflector assembly of the preferred embodiment of this invention that is preferred for the injection of gases is shown in detail in the enlarged cross sectional view of FIG. 6. A pipe 8, carries a gas that is to be mixer into the main flow to the deflector 132. A cylindrical passage 148, runs along the centerline on the deflector 132. The pipe 8, is connected to this cylindrical passage 148, by a suitable means. The walls of the cylindrical passage 148, are parallel. At the end of the cylindrical passage 148, a recess 49, is machined into the cylindrical passage 148. A gas educator tip 50, is fitted into the recess 49, by a suitable means. The gas educator tip 50, is shown in detail in FIG. 7, which is an enlarged drawing of a portion of FIG. 6. The front surface of the gas educator tip 50, is preferably a hemisphere, although another surface of rotation could be used. The equator of the hemisphere is faired inwards toward the deflector centerline 55, to forestall detachment of the jet flow as it flows around the gas educator tip 50. A hollow cylinder 54, projects from the rear of the gas educator tip 50, and this cylinder 54, is connected to the recess 49, machined into the front of the deflector 132, be a suitable means. Circular ports 53, drilled into the cylinder 54, allow the gas that flows through the passage 148, in the deflector to escape and mix with the jet flow.

The preferred materials of construction generally follow for both embodiments of the invention as those that are described in described in column 5, lines 3 through 11 of U.S. Pat. No. 5,183,335, although other materials may be used when it is suitable.

The surfaces of the deflector bodies 32, and 132, which deflect the jet flow, are shown as elliptical surfaces of rotation for illustrative purposes. The surfaces may be topologically transformed without changing the basic mixing properties of the flash mixer according to the invention.

The first embodiment of the invention had been described as operating in a water treatment plant and the second embodiment of the invention has been described as operating in a waste water treatment plant. These descriptions are for illustrative purposes and are not intended to limit the potential applications of this invention which may be used to mix any fluids, gases or slurries into a stream consisting of any fluids, gases or slurries.

OPERATION OF THE INVENTION

Figure 8:
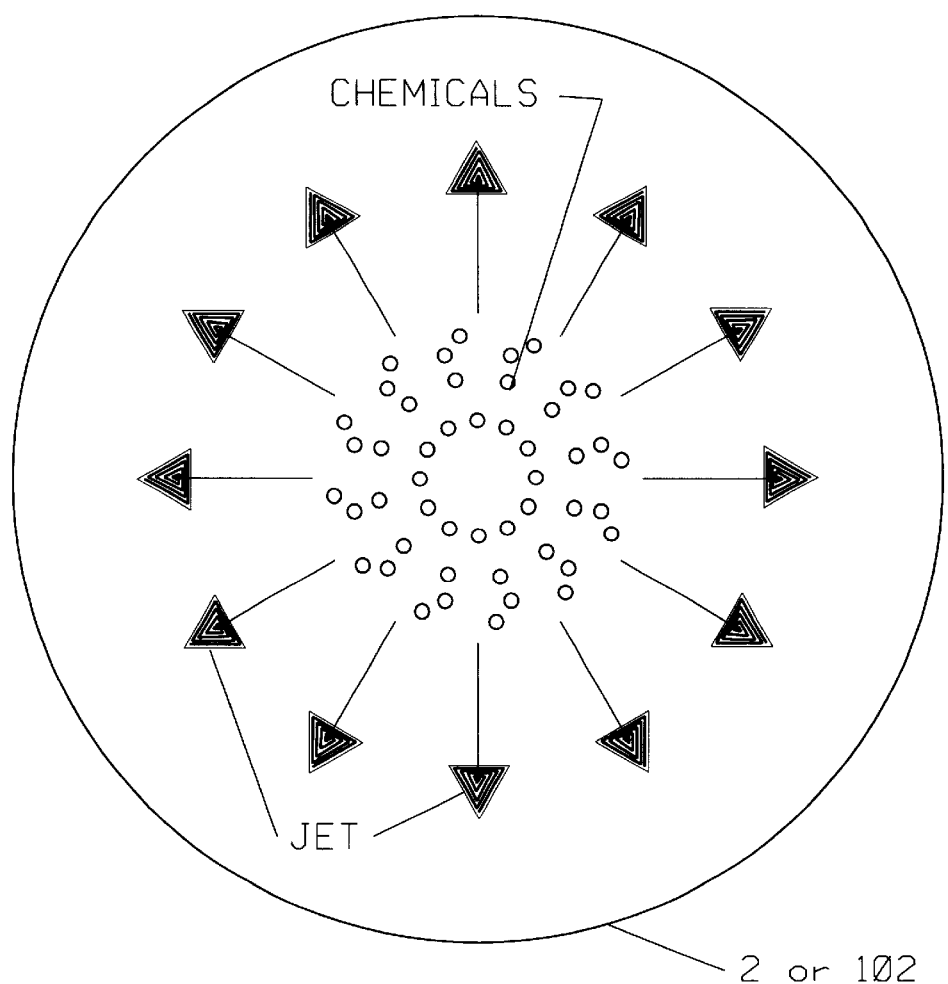
FIG. 8 is a schematic sectional view of a conduit taken along line 8—8 of FIG. 2 and of FIG. 5 to show how jetted water and injected chemicals disperse throughout the conduit.

In the first embodiment, raw water flows through the secondary pipe 12, to the water jet nozzle where the potential energy of the water jet stream is converted into kinetic energy by the convergent nozzle 28. The injected water strikes the deflector assembly and has its momentum changed such that the jet becomes a desired pattern, in this case a radially expanding sheet of water directed towards the boundary of the conduit 2, as shown in the schematic sectional view of FIG. 8, taken along line 8—8 of FIG. 2 Since the deflector is at rest relative to the water jet nozzle and since the drag force of the deflector on the water is negligible in comparison to the kinetic energy of the jet, the radially expanding water jet leaves the boundary of the deflector with the same kinetic energy imparted to it by the water jet nozzle. This kinetic energy is converted to mixing energy through turbulent vortex formation. The vortices are formed when the jet water transfers momentum to the cross flow, i.e., the main flow direction (perpendicular to the pipe for FIG. 8), in the conduit. Momentum transfer takes place both in the volume of water swept out by the diverging water jet as it travels toward the conduit boundary and in the volume of the vortices shed from the diverging water jet and swept downstream by the main flow current. As shown in FIG. 8, the coagulant C mixed into the water jet is carried by the jet as it travels toward the conduit boundary.

Figure 5:
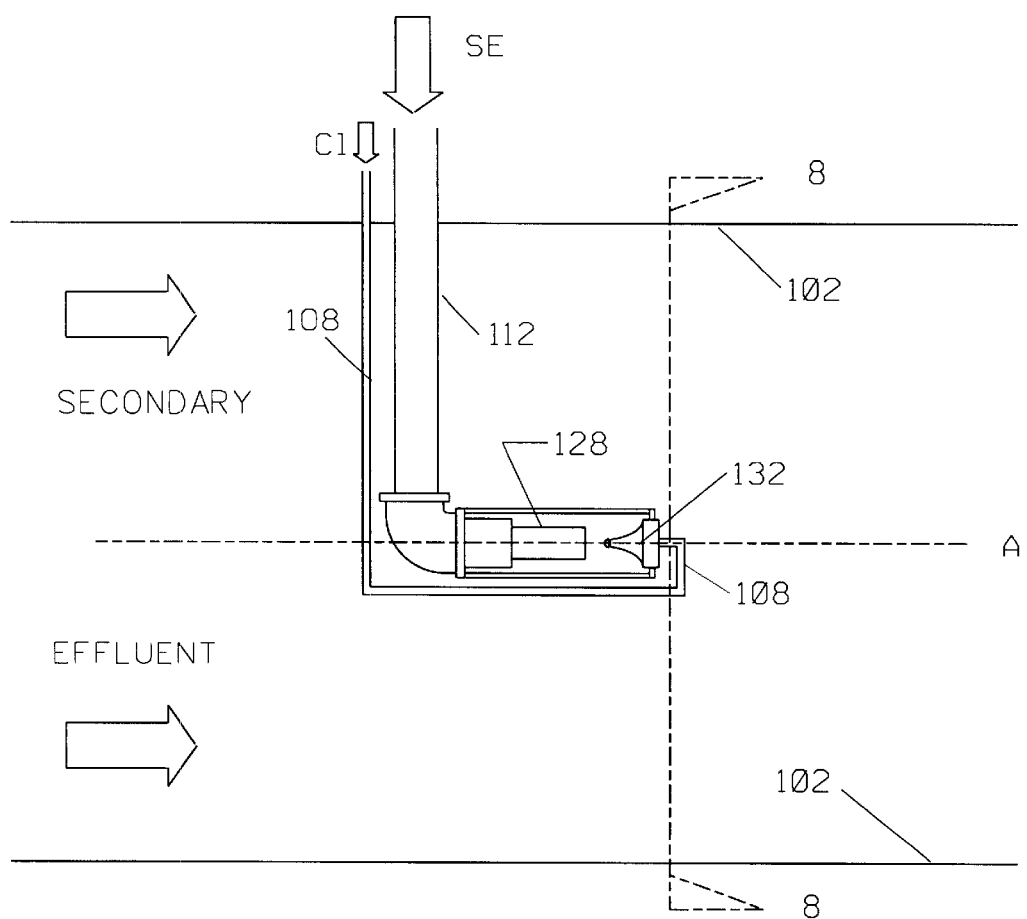
FIG. 5 shows a second embodiment of the inventive mixer in which chlorine gas is introduced into a deflecting device of the mixer.

In the second embodiment, secondary effluent flows through the secondary pipe 112, to the water jet nozzle where the potential energy of the water jet stream is converted into kinetic energy by the convergent nozzle 128. The injected water strikes the deflector assembly and has its momentum changed such that the jet becomes a desired pattern, in this case a radially expanding sheet of water directed towards the boundary of the conduit 102, as shown in the schematic sectional view of FIG. 8, taken along line 8—8 of FIG. 5. Since the deflector is at rest relative to the water jet nozzle and since the drag force of the deflector on the water is negligible in comparison to the kinetic energy of the jet, the radially expanding water jet leaves the boundary of the deflector with the same kinetic energy imparted to it by the water jet nozzle. This kinetic energy is converted to mixing energy through turbulent vortex formation. The vortices are formed when the jet water transfers momentum to the cross flow, i.e., the main flow direction (perpendicular to the pipe for FIG. 8), in the conduit. Momentum transfer takes place both in the volume of water swept out by the diverging water jet as it travels toward the conduit boundary and in the volume of the vortices shed from the diverging water jet and swept downstream by the main flow current. As shown in FIG. 8, the chlorine gas Cl, mixed into the water jet is carried by the jet as it travels toward the conduit boundary.

Ideally, the incremental flow along any radial line from axis A will be proportional to the distance along that line from the axis A to the conduit boundary. Therefore, for a circular conduit, the shape of the deflector is such that the flow is uniform in all radial directions. For non-circular conduits, the deflector should be shaped to achieve proportionally greater flow in those radial directions where the distance from the axis to the conduit boundary is greater. For example, a square conduit flow should increase as the radial direction goes from the center of each side towards a corner. However, as a practical matter, a deflector shape yielding a symmetrical or uniform flow distribution should generally be sufficient to achieve relatively uniform mixing. This supposition has been tested by CFD modeling and is supported by such modeling. The general result is that uniform mixing does occur in the volume of a non-circular conduit that is further from the axis. However, the point at which uniform mixing is attained is further downstream from the mixer location than in the volume that is closer to the axis.

In contrast to the disclosure of U.S. Pat. No. 5,183,335, the deflector assemble does not have the poppet valve shown in the first embodiment disclosed in that patent. Nor does the water jet nozzle have the central coagulant feed tube that is shown in the second embodiment disclosed in that patent. This avoids the complexity of the poppet valve in the first embodiment and the potential for clogging the poppet valve. In the second embodiment, the complexity of providing a suitable spider to steady the coagulant feed tube is avoided. Moreover, the potential for clogging because of tramp material in the raw water becoming trapped on the spider is also avoided.

In the first embodiment of U.S. Pat. No. 5,183,335 the headloss created by the poppet valve ensured even distribution in all radial directions of the chemical to be mixed with the main flow in the conduit. In the first embodiment of this patent the action of hydrodynamic forces created by the flow of the jet water provides the function of the poppet valve's headloss. The hydrodynamic force acting on the fluid carried in the tube 48, of the deflector prevents the fluid from flowing freely out of the deflector tip. This hydrodynamic force is commonly known as the stagnation pressure, and is caused by the deceleration of the jet flow to zero velocity relative to the deflector tip as the jet approaches the flat surface of the fluid trapped in tube 48. One common utilization of the stagnation pressure phenomenon is in the pitot anemometer used to measure the air speed of airplanes. The most common application of a hydraulic jet diffusion mixer is with the axis of the jet nozzle and the deflector in the horizontal position. In the absence of a stagnation pressure acting on the fluid in tube 48, the fluid would flow preferentially out of the lowest point of tube 48, thus leading to an uneven distribution of the chemical in the radial directions. If the stagnation pressure is strong enough that the pressure created by gravity acting on the fluid in tube 48 can be neglected, then an even distribution of the chemical in the radial directions can be achieved.

The magnitude of the stagnation pressure is a function of the rate of flow of the water jet, the diameter of the water jet nozzle and the diameter of the opening at the tip of the deflector. The first two parameters are set by the particulars of a mixer installation, the size and shape of the main conduit, the rate of flow in the main conduit, and the downstream distance from the mixer location to the point in the main conduit where the required degree of blending is to be attained, and since it is desirable that the diameter of the base of the deflector be twice the diameter of the water jet nozzle; the diameter of the deflector tip opening is the remaining design parameter that is left free to be used to set the stagnation pressure. The diameter of the deflector tip opening is set by adjusting the degree of curvature of the bell mouth 50, of tube 48. In addition, it is preferable that the mouth of tube 48 be bell shaped because the bell shape decreases the chance that any solid particles can become trapped in tube 48. This is particularly important when the chemical to be mixed into the main flow is carried in the form of a slurry.

The operation of the second embodiment is similar to that of the first embodiment, except that the second embodiment is preferred when the chemical that is to be mixed into the main conduit flow is in the form of a gas. In this embodiment the tube 148, that passes through the deflector 132, is capped with a gas educator tip 50. The gas that is to be mixed into the main conduit flow passes through tube 148 and flows out of the deflector 132 through the orifices 53. The jet of water flowing from nozzle 128 is co-linear with the longitudinal axis of tube 148, thus the center of this jet impinges on the gas educator tip 50. The curved front surface 52 of the gas educator tip 50 causes the water jet to flow smoothly over the gas educator tip 50 with a minimum amount of turbulence. The surface 52 is preferably a hemisphere, however other surfaces of revolution could also be used. The velocity of the water jet reduces the pressure in the void space 56 that surrounds the orifices 53 through the action of the familiar Venturi principal, wherein the pressure at a point in a moving fluid is lower than the pressure at a point at the same elevation in a stationary fluid. The low pressure in the void space 56 creates a partial vacuum that pulls the gas through the tube 148 and the pipe 108. It is preferable to carry gas through piping at reduced pressure since that practice precludes the possibility of a leak to the atmosphere. As the jet water flows over the gas educator tip 50, the curved surface 55 at the base of the hemispherical surface 52 causes a portion of the jet water to flow into the void space 56, thus creating turbulent eddies in the void space. The shear forces generated by the eddies cause the gas passing through the orifices 53 to form small bubbles that are carried away by the water jet and mixed into the main conduit flow. It is preferred that the gas be mixed in the form of small bubbles, as the efficiency of the mass transfer across the gas to liquid interface of a bubble increases with decreasing bubble diameter.

The foregoing disclosure and drawings are merely illustrative of this invention and are not to be interpreted in a limiting sense. The invention is described by the claims.

I claim:
1. Apparatus for injecting and mixing coagulant into a liquid stream by flash mixing comprising:
   a) a conduit for carrying the liquid stream without coagulant in a first direction;
   b) injection means having an outlet for injecting a fluid jet stream into the liquid stream;
   c) means for drawing off a portion of the liquid stream from a predetermined position along the conduit and for supplying the drawn-off portion to the injection means to form the fluid jet stream;
   d) a deflector disposed proximate to and in front of the outlet for deflecting the fluid jet stream in a second direction transverse to the first direction of the liquid stream, the deflector having a central axis and a passage coincident with the central axis, the passage having an opening at a position of the deflector which is closest to the outlet, for introducing the coagulant into the fluid jet stream such that the coagulant is carried in the second direction by the deflected fluid jet stream for mixing into the liquid stream; and
   e) means for conveying the coagulant under pressure into the passage,
      wherein the predetermined position is upstream of the deflector, such that the conduit is adapted for carrying the liquid stream with the coagulant mixed therein away from the deflector, thereby avoiding back mixing.

2. The apparatus of claim 1, wherein the deflector comprises a conical form having a base and a vertex, the vertex being proximate to the outlet and the opening being located at the vertex.

3. The apparatus of claim 2, wherein the opening has a perimeter which is a circle and the circle lies in a plane parallel to the base of the conical form.

4. The apparatus of claim 3, wherein the opening is an intersection of the passage with a surface of the deflector at the vertex.

5. The apparatus of claim 4, wherein the passage is largest in diameter at the opening and an end of the passage opposite the opening is in communication with the means for conveying coagulant.

6. The apparatus of claim 5, wherein the injection means for injecting injects the fluid jet stream in the first direction.

7. The apparatus of claim 5, wherein the injection means for injecting comprises a high-velocity jet nozzle at the outlet thereof.

8. The apparatus of claim 5, wherein the injection means for injecting and the deflector have central axes with are aligned.

9. The apparatus of claim 5, wherein the deflector has a shape such that the fluid jet steam is deflected in a symmetrical pattern.

10. The apparatus of claim 5, wherein the second direction is normal to the first direction.

11. The apparatus of claim 5, wherein the deflector is shaped as a surface of revolution about a central axis of the fluid jet stream.

12. The apparatus of claim 5, further comprising a flocculation unit downstream of the deflector, wherein the conduit is adapted for carrying the liquid stream with the coagulant to the flocculation unit.

13. Apparatus for injecting and mixing a second liquid into a first liquid stream by flash mixing comprising:
   a) a conduit for carrying the first liquid stream without the second liquid in a first direction;

b) injection means having an outlet for injecting a fluid jet stream into the first liquid stream;

c) means for drawing off a portion of the first liquid stream from a predetermined position along the conduit and for supplying the drawn-off portion to the injection means to form the fluid jet stream;

d) a deflector disposed proximate to and in front of the outlet for deflecting the fluid jet stream in a second direction transverse to the first direction of the first liquid stream, the deflector having a central axis and a passage coincident with the central axis, the passage having an opening at a position of the deflector which is closest to the outlet, for introducing the second liquid into the fluid jet stream such that the second liquid is carried in the second direction by the deflected fluid jet stream for mixing into the first liquid stream; and e) means for conveying the second liquid under pressure into the passage, wherein the predetermined position is upstream of the deflector, such that the conduit is adapted for carrying the first liquid stream with the second liquid mixed therein away from the deflector, thereby avoiding back mixing.

14. The apparatus of claim 13, wherein the deflector comprises a conical form having a base and a vertex, the vertex being proximate to the outlet and the opening being located at the vertex.

15. The apparatus of claim 14, wherein the opening has a perimeter which is a circle and the circle lies in a plane parallel to the base of the conical form.

16. The apparatus of claim 15, wherein the opening is an intersection of the passage with a surface of the deflector at the vertex.

17. The apparatus of claim 16, wherein the passage is largest in diameter at the opening and an end of the passage opposite the opening is in communication with the means for conveying the second liquid.

18. The apparatus of claim 17, wherein the injection means for injecting injects the fluid jet stream in the first direction.

19. The apparatus of claim 17, wherein the injection means for injecting comprises a high-velocity jet nozzle at the outlet thereof.

20. The apparatus of claim 17, wherein the injection means for injecting and the deflector have central axes with are aligned.

21. The apparatus of claim 17, wherein the deflector has a shape such that the fluid jet steam is deflected in a symmetrical pattern.

22. The apparatus of claim 17, wherein the second direction is normal to the first direction.

23. The apparatus of claim 17, wherein the deflector is shaped as a surface of revolution about a central axis of the fluid jet stream.

24. Apparatus for injecting and mixing a slurry into a liquid stream by flash mixing comprising:

a) a conduit for carrying the liquid stream without the slurry in a first direction;

b) injection means having an outlet for injecting a fluid jet stream into the liquid stream;

c) means for drawing off a portion of the liquid stream from a predetermined position along the conduit and for supplying the drawn-off portion to the injection means to form the fluid jet stream;

d) a deflector disposed proximate to and in front of the outlet for deflecting the fluid jet stream in a second direction transverse to the first direction of the liquid stream, the deflector having a central axis and a passage coincident with the central axis, the passage having an opening at a position of the deflector which is closest to the outlet, for introducing the slurry into the fluid jet stream such that the slurry is carried in the second direction by the deflected fluid jet stream for mixing into the liquid stream; and e) means for conveying the slurry under pressure into the passage, wherein the predetermined position is upstream of the deflector, such that the conduit is adapted for carrying the liquid stream with the slurry mixed therein away from the deflector, thereby avoiding back mixing.

25. The apparatus of claim 24, wherein the deflector comprises a conical form having a base and a vertex, the vertex being proximate to the outlet and the opening being located at the vertex.

26. The apparatus of claim 25, wherein the opening has a perimeter which is a circle and the circle lies in a plane parallel to the base of the conical form.

27. The apparatus of claim 26, wherein the opening is an intersection of the passage with a surface of the deflector at the vertex.

28. The apparatus of claim 27, wherein the passage is largest in diameter at the opening and an end of the passage opposite the opening is in communication with the means for conveying slurry.

29. The apparatus of claim 28, wherein the injection means for injecting injects the fluid jet stream in the first direction.

30. The apparatus of claim 28, wherein the injection means for injecting comprises a high-velocity jet nozzle at the outlet thereof.

31. The apparatus of claim 28, wherein the injection means for injecting and the deflector-have central axes with are aligned.

32. The apparatus of claim 28, wherein the deflector has a shape such that the fluid jet steam is deflected in a symmetrical pattern.

33. The apparatus of claim 28, wherein the second direction is normal to the first direction.

34. The apparatus of claim 28, wherein the deflector is shaped as a surface of revolution about a central axis of the fluid jet stream.

* * * * *